(12) United States Patent
Matsumoto et al.

(10) Patent No.: US 9,850,910 B2
(45) Date of Patent: Dec. 26, 2017

(54) PORTABLE WORKING MACHINE

(71) Applicant: YAMABIKO CORPORATION, Tokyo (JP)

(72) Inventors: Kosuke Matsumoto, Tokyo (JP); Takuo Yoshizaki, Tokyo (JP); Yuuta Kobayashi, Tokyo (JP); Hisato Osawa, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 15/093,910

(22) Filed: Apr. 8, 2016

(65) Prior Publication Data

US 2016/0298551 A1 Oct. 13, 2016

(30) Foreign Application Priority Data

Apr. 9, 2015 (JP) ................. 2015-080433

(51) Int. Cl.
| | |
|---|---|
| F01P 7/04 | (2006.01) |
| F04D 25/02 | (2006.01) |
| F01P 1/06 | (2006.01) |
| F01P 5/02 | (2006.01) |
| F02B 63/02 | (2006.01) |
| G01K 13/00 | (2006.01) |
| F04D 29/28 | (2006.01) |
| H02K 7/18 | (2006.01) |
| F02B 75/02 | (2006.01) |

(52) U.S. Cl.
CPC ............. *F04D 25/02* (2013.01); *F01P 1/06* (2013.01); *F01P 5/02* (2013.01); *F02B 63/02* (2013.01); *F04D 29/282* (2013.01); *G01K 13/00* (2013.01); *H02K 7/1807* (2013.01); *F02B 2075/025* (2013.01); *F02D 2200/021* (2013.01); *F02D 2400/06* (2013.01)

(58) Field of Classification Search
CPC ..... F04D 25/02; F04D 29/282; H02K 7/1807; G01K 13/00; F02B 63/02; F02B 2075/025; F01P 1/06; F01P 5/02; F02D 2200/021; F02D 2400/06
See application file for complete search history.

(56) References Cited

U.S. PATENT DOCUMENTS

| | | | | |
|---|---|---|---|---|
| 4,901,701 A | * | 2/1990 | Chasteen ................ | F02D 37/02 123/478 |
| 4,979,477 A | * | 12/1990 | Nickel .................... | F02B 63/02 123/335 |
| 5,673,667 A | * | 10/1997 | Nakamura .............. | F02D 37/02 123/406.29 |
| 6,314,922 B1 | | 11/2001 | Zimmermann et al. | |

(Continued)

FOREIGN PATENT DOCUMENTS

| | | | | |
|---|---|---|---|---|
| CN | 201334954 Y | * | 10/2009 | ............... F02F 1/00 |
| JP | S56-054940 A | | 5/1981 | |

*Primary Examiner* — Hung Q Nguyen
(74) *Attorney, Agent, or Firm* — Kilyk & Bowersox, P.L.L.C.

(57) ABSTRACT

To enhance responsivity of temperature sensor detecting an engine temperature. A temperature sensor component 40 includes a metal washer 42. The temperature sensor component 40 transfers the engine temperature to a sensor body 46 via the heat transfer washer 42. A cylinder portion 8 of a cylinder block 64 has two bosses 30. The washer 42 of the temperature sensor component 40 is fixed to the boss 30 together with the electronic control unit 20.

5 Claims, 8 Drawing Sheets

(56) References Cited

U.S. PATENT DOCUMENTS

2010/0147544 A1 6/2010 Yoshizaki et al.
2011/0107985 A1* 5/2011 Gorenflo ............... F02D 35/025
                                                    123/41.65
2016/0298552 A1 10/2016 Yoshizaki et al.

* cited by examiner

PORTABLE WORKING MACHINE

BACKGROUND OF THE INVENTION

The present invention relates to portable working machines. More particularly, the present invention relates to a portable working machine, such as a chain saw, a blower, or a brush cutter, provided with a control unit for performing various controls using an engine temperature as a parameter.

Electronic controllers are currently employed for controlling automobile engines and motorcycle engines. Japanese Patent Laid-Open No. 2000-52280 discloses a chain saw. A portable working machine, such as a chain saw or a brush cutter, typically employs a combination of an air-cooled single cylinder engine and a carburetor. An increasing number of engines applied to this kind of working machine is controlled electronically.

Japanese Patent Laid-Open No. 2010-151125 discloses a working machine that employs an electronic controller for controlling the engine at start of the same. To be more specific, the working machine disclosed in Japanese Patent Laid-Open No. 2010-151125 is provided with a microcomputer. The microcomputer is supplied with electrical power by a power generating mechanism that starts generating electric power as the engine starts up. The microcomputer receives an engine speed signal. Then, the microcomputer performs ignition control of stopping operation of the spark plug when an engine speed immediately after the engine start-up is higher than a predetermined speed.

Japanese Patent Laid-Open No. 56-54940 proposes that a temperature sensing member be installed on a cylinder head for engine control. The temperature sensing member is constituted by a bimetal and a casing. To be specific, the cylinder head has a recess. The temperature sensing member is bolted to the cylinder head, with the bimetal inserted in the recess.

The casing accommodates the bimetal and first and second control valves. The first control valve is used for starter control. The second control valve is used for leak air control. The first and second control valves are directly driven by the bimetal. The starter control valve and the leak air control valve are related to a carburetor. When an engine temperature increases, the first control valve for starter control is shifted toward a closed position, while the second control valve for leak air control is shifted toward an open position. This changes a gas mixture to be supplied to the engine from rich to lean.

Japanese Patent Laid-Open No. 56-54940 discloses a mounting position and a mounting structure of a temperature sensing member formed by combining two needle valves associated with an air passage leading to the carburetor, and the bimetal having the two needle valves fixed thereto.

As described above, most automobile engines and motorcycle engines are currently controlled electronically. Single cylinder engines for portable working machines also tend to include electronic control to improve engine performance to be more accurate. For example, electronic control of the portable working machine includes control using an engine temperature as a parameter, typically, fuel amount increasing correction control at the engine start as in Japanese Patent Laid-Open No. 56-54940.

In an air-cooled engine employed in portable working machine, an engine load is related to an engine temperature. That is, the engine temperature increases in a short time in response to an increase in the engine load. In contrast, the engine temperature decreases when there is no engine load. In order to know the engine conditions, the engine temperature is easy to detect. Accordingly, the control using the engine temperature as a parameter is employed in the electronic control of the portable working machine. Examples of the electronic control include fuel amount control in accordance with an engine load during driving.

An object of the present invention is to provide an air-cooled engine that allows a temperature sensor detecting the engine temperature to provide excellent responsivity.

Another object of the present invention further is to provide an air-cooled engine that requires reduced assembling and replacement works of the temperature sensor component detecting the engine temperature.

A further object of the present invention further is to provide an air-cooled engine that inhibits accidental disconnection of a wire between a temperature sensor and a control unit.

SUMMARY OF THE INVENTION

In order to achieve the above objects, the present invention provides a portable working machine including a control unit controlling the portable working machine using an engine temperature as a parameter, the portable working machine including:
  an air-cooled engine body;
  a mounting part formed at a cylinder block of the engine body;
  a temperature sensor component including a heat transfer terminal, the temperature sensor component detecting the engine temperature and supplying the detected engine temperature to the control unit; and
  a fixing member for fixing the heat transfer terminal of the temperature sensor component to the mounting part.

When the mounting part has a threaded hole, the fixing member is a bolt that is screwed into the threaded hole. When the mounting part has a screw member, the fixing member is a nut. The cylinder block is a member forming a combustion chamber. In the present invention, the temperature sensor component is mounted to the mounting part formed at the cylinder block. Accordingly, the engine temperature is detected responsively by means of the temperature sensor component.

In a preferable embodiment of the present invention, the temperature sensor component is mounted to the cylinder portion of the cylinder block. The cylinder portion of the cylinder block, as is well known, has a combustion chamber. A spark plug may be used for mounting the temperature sensor component. That is, the mounting part includes a mounting part for the spark plug.

Heat of the cylinder block is detected by a sensor body via the heat transfer terminal included in the temperature sensor component. Then, the detected temperature is transferred from the sensor body through a lead wire to the control unit. The temperature sensor component may be installed as close to a connection terminal of the control unit as possible. The engine body is partially covered by an engine cover. The engine cover is removable. The temperature sensor component may be arranged in an area covered by the engine cover. The temperature sensor component may be arranged in an area where the entire temperature sensor component including the lead wire is exposed when the engine cover is removed. With this configuration, the entire temperature sensor component including the lead wire is exposed by just removing the engine cover when a manufacturer of the portable working machine assembles the temperature sensor component to the engine body or when a user replaces a failed temperature sensor. In this way, the temperature sensor component can be assembled and replaced easily. The mounting part may be arranged in an area where the lead wire of the temperature sensor component does not interfere with another component. This inhibits accidental disconnection of the lead wire connecting the temperature sensor component to the control unit.

Other objects, and operations and effects of the present invention will become apparent from the following detailed description of preferable embodiments of the present invention.

DETAILED DESCRIPTION OF THE PRESENT INVENTION

Hereinafter, a preferable embodiment of the present invention will be described based on the attached drawings.

Figure 1:
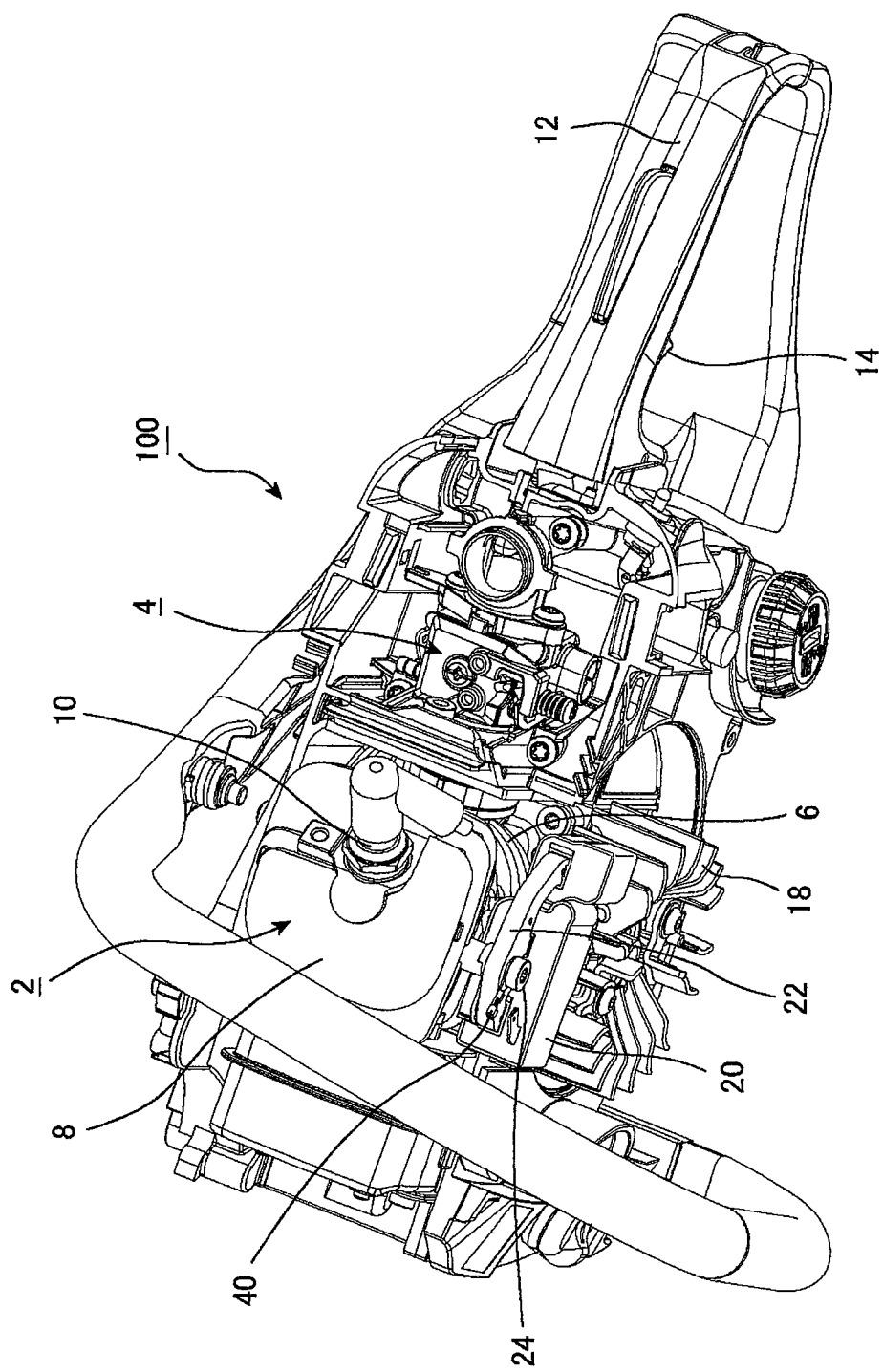
FIG. 1 is a perspective view of a drive portion of a portable working machine to which the present invention is applied.

FIG. 1 shows an embodiment of the present invention. Referring to FIG. 1 showing a drive portion of a portable working machine of the embodiment, with an engine cover covering a part of an engine body removed from the machine, reference numeral 100 denotes the drive portion of the portable working machine. The drive portion 100 in the figure corresponds to a main body of a chain saw. The drive portion 100 includes an engine body 2 and a carburetor 4. The engine body 2 is formed by a 2-stroke internal combustion engine. The 2-stroke internal combustion engine has a single cylinder and is of air-cooled type.

Reference numeral 6 in FIG. 1 denotes an air-cooling fin. The air-cooling fin 6 is formed at a cylinder portion 8 of a cylinder block. The cylinder block (denoted by reference numeral 64 in FIG. 8 to be described later) is made of an aluminum alloy. Aluminum alloys, as is well known, have excellent thermal conductivity.

The cylinder portion 8 has a spark plug 10 mounted at a top portion thereof. Although not shown in the figure, the cylinder portion 8 has on the top portion a mounting seat provided with a threaded hole that is formed integrally with the cylinder portion 8. At the same time, the spark plug 10 has threads at a tip portion. The spark plug 10, as is well known, is screwed to the mounting seat.

The output of the engine body 2 is controlled by manipulating the throttle lever 14 arranged at the handle 12. A fan rotor 18 is attached to an end of an engine output shaft, that is, a crankshaft (denoted by a reference numeral 16 in FIG. 8 to be described later).

Figure 2:
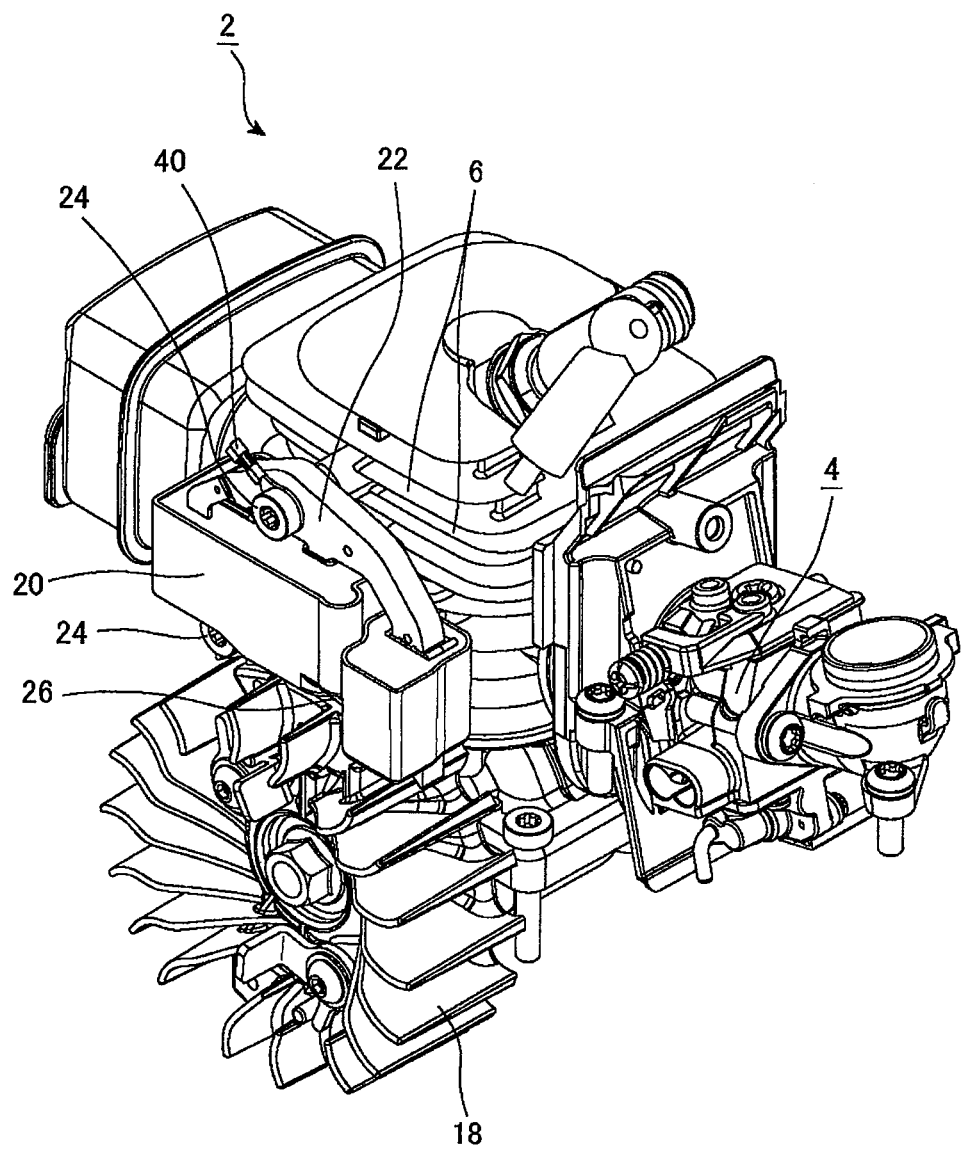
FIG. 2 shows a portion of the portable working machine in FIG. 1 where an engine body and, in relation to the engine body, a control unit are arranged.
Figure 3:
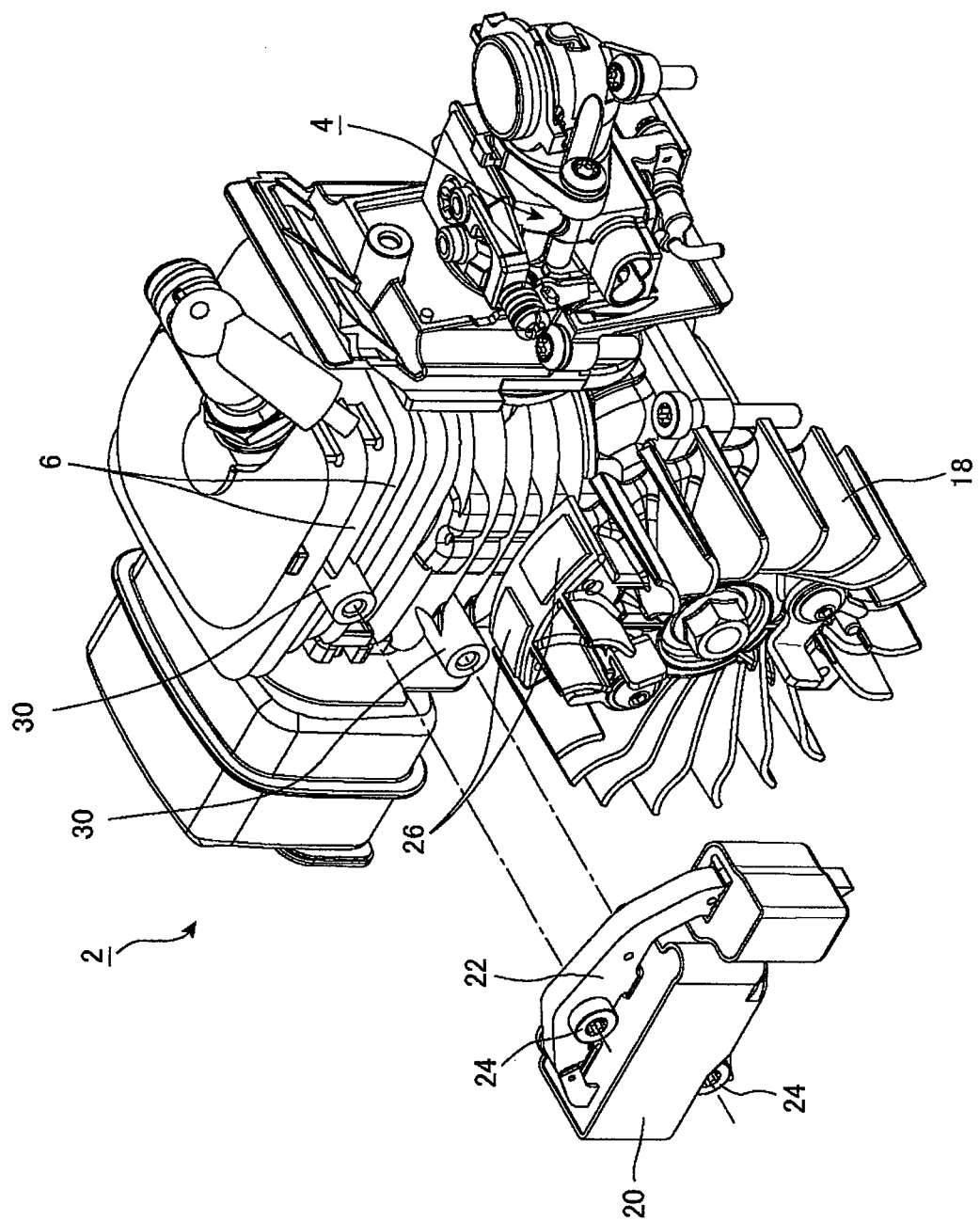
FIG. 3 is an exploded view corresponding to FIG. 2.
Figure 4:
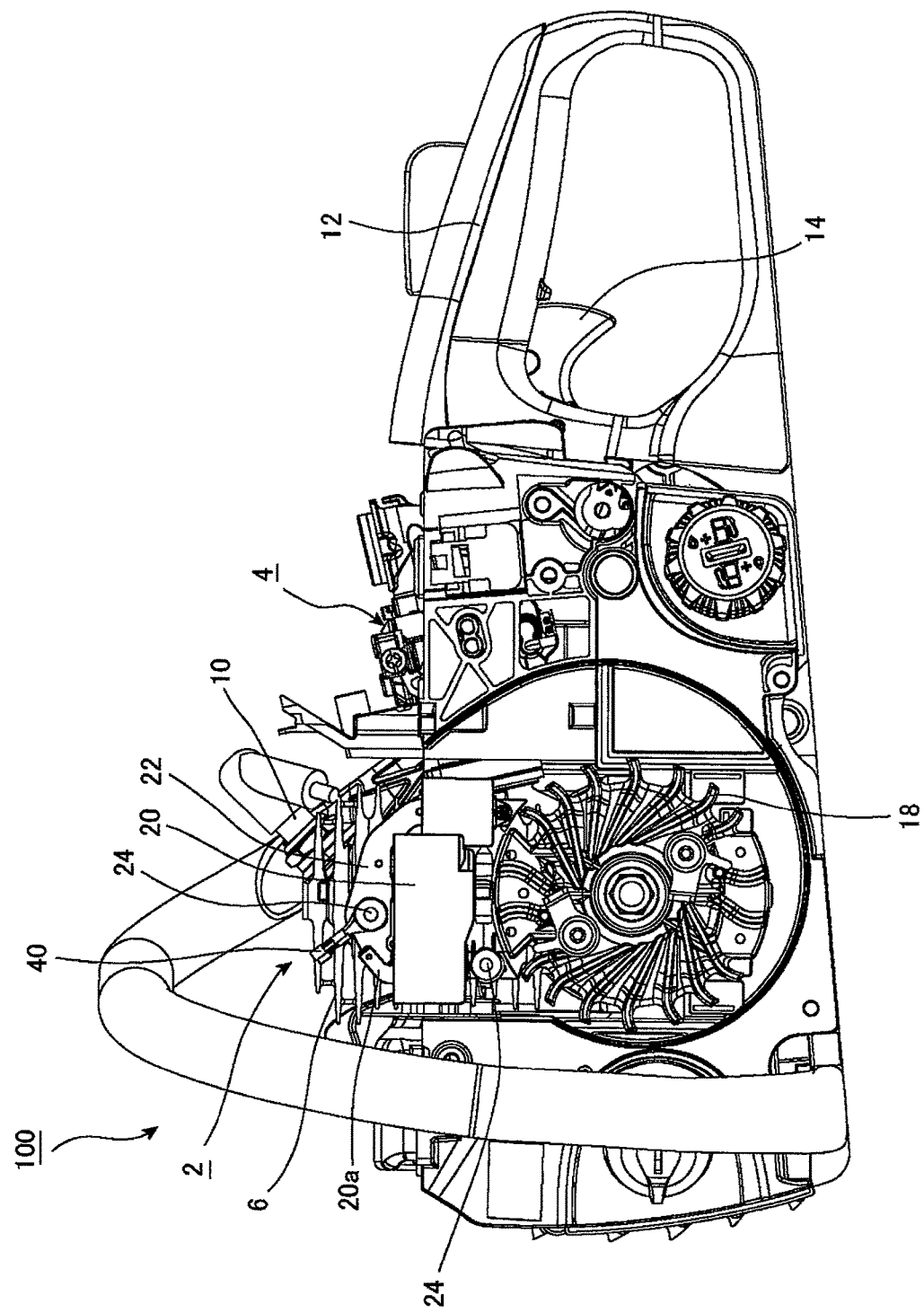
FIG. 4 is a side view of the drive portion of the portable working machine to which the present invention is applied, and corresponds to FIG. 1.

Reference numeral 20 denotes an electronic control unit. The electronic control unit 20 is covered with a removable engine cover. The electronic control unit 20 includes a microcomputer encapsulated in a resin. FIG. 2 is an enlarged view showing the electronic control unit 20 and its vicinity. FIG. 3 is a side view of the engine body 2 with the carburetor 4 of the working machine in FIG. 1 in which the control unit 20 is removed from the machine. FIG. 4 is a side view of the drive portion 100 in FIG. 2.

The electronic control unit 20 is supported by a base plate 22. The base plate 22 is formed of a ferrous metal. Referring to FIG. 4, the electronic control unit 20 is fixed to the cylinder portion 8 via the base plate 22 by using two bolts 24. The bolts 24, as is known, have threads. The electronic control unit 20 is made positioned relative to the fan rotor 18 when fixed to the cylinder portion 8.

Figure 5:
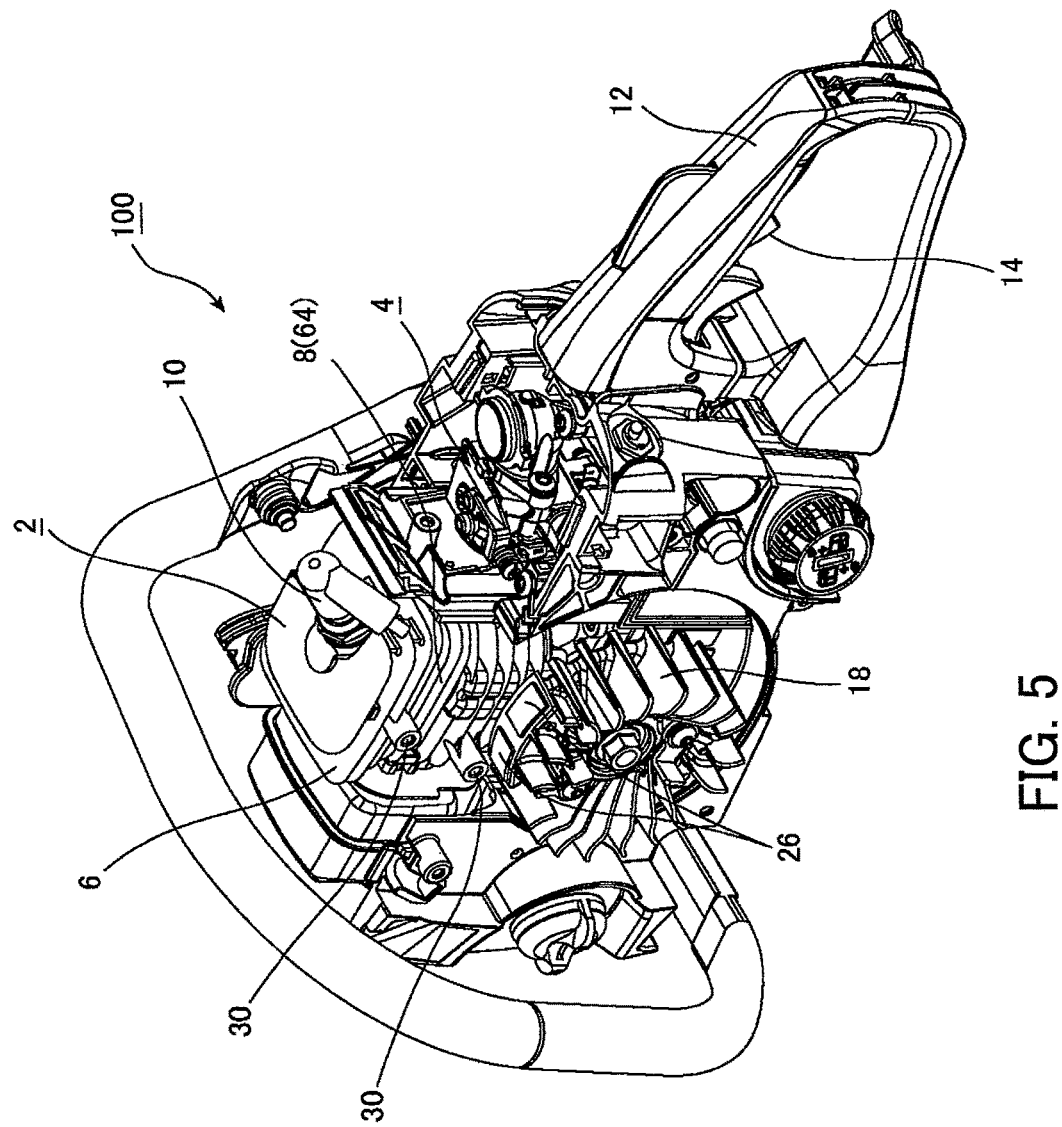
FIG. 5 is a perspective view of the drive portion of the portable working machine with the control unit removed from the machine, and corresponds to FIG. 1.
Figure 8:
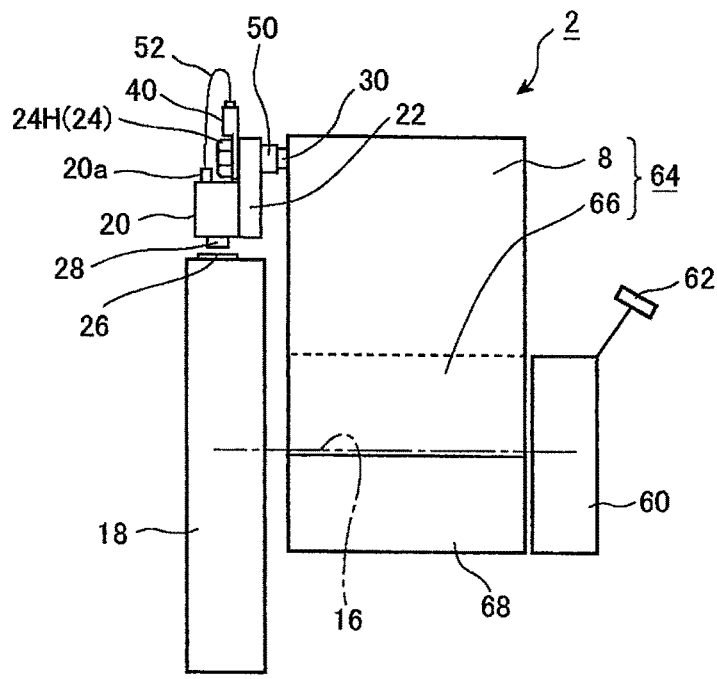
FIG. 8 is an illustration for describing the outline of the portable working machine in the embodiment.

Referring to FIGS. 3, 5, and 8, the fan rotor 18 has plate-like magnets 26 embedded on an outer circumferential surface thereof. On the other hand, the electronic control unit 20 has an iron core 28 (FIG. 8) extending toward the outer circumferential surface of the fan rotor 18. The control unit 20 is positioned such that a clearance between an end surface of the iron core 28 and the plate-like magnets 26 has a predetermined distance.

The magnets 26 arranged on the rotating fan rotor 18 and the iron core 28 located adjacent to the magnets 26 partially form a power generating mechanism. Electric power is generated as the engine body 2 starts operation, and the control unit 20 is operated upon receiving the electric power.

Reference numerals 30 in FIGS. 3, 5, 8, and 9 each denotes a boss. Each boss 30 has a threaded hole. The two bosses 30 each receive the corresponding bolt 24. The electronic control unit 20 is fixed to the cylinder portion 8 of the cylinder block 64 by using the two bosses 30.

Figure 6:
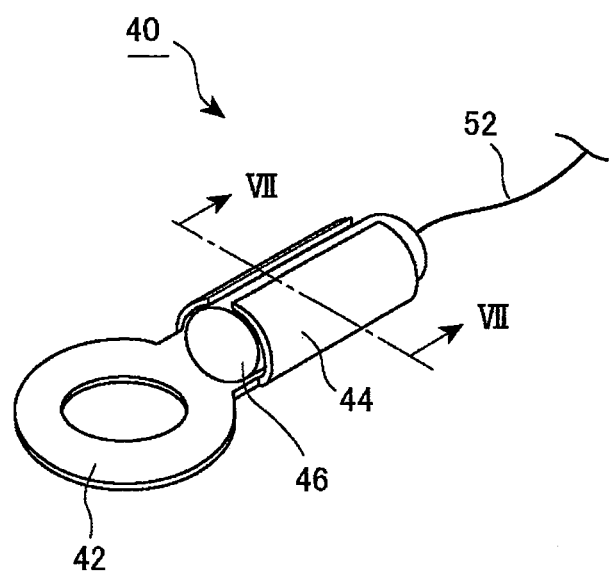
FIG. 6 is a perspective view of a temperature sensor component included in an embodiment.
Figure 7:
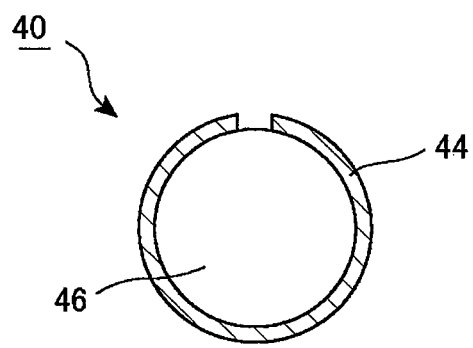
FIG. 7 is a cross-sectional view of the temperature sensor component taken along the line VII-VII in FIG. 6.

Reference numeral 40 in FIGS. 1 and 2 denotes a temperature sensor component. FIG. 6 shows a temperature sensor component 40. The temperature sensor component 40 includes a flat metal terminal, a washer 42. FIG. 7 is a cross-sectional view taken along the line VII-VII in FIG. 6. The washer 42 is made of a heat transfer material, typically, made of metal. Modifications of the washer 42 shown in the figure may include a Y-shaped terminal.

Referring to FIG. 6, the heat transfer washer 42 includes a slitted tube or at least a pair of facing claws 44. A cylindrical sensor body 46 is inserted into the slitted tube or facing claws 44 and the sensor body 46 is fixed as the slitted tube or facing claws 44 is deformed. That is, the temperature sensor component 40 is constituted by the heat transfer washer 42 provided with the slitted tube or facing claws 44 and the sensor body 46 fixed to the slitted tube or facing claws 44.

The temperature sensor component 40 transfers an engine temperature to the sensor body 46 through the heat transfer washer 42. The engine temperature detected by the sensor body 46 is supplied to the control unit 20.

Figure 9:
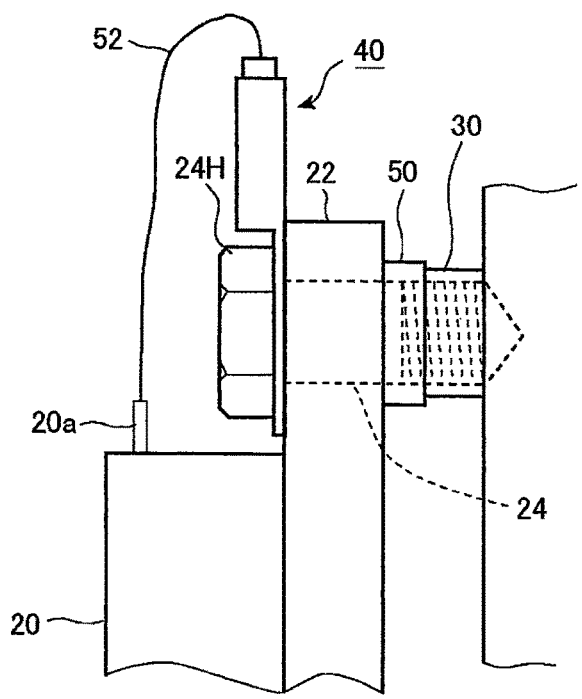
FIG. 9 shows a relevant portion taken from FIG. 8.

FIG. 8 is an illustration for describing a mounting part for the temperature sensor component 40. The temperature sensor component 40 is preferably arranged at one of the two bosses 30 for fixing the control unit 20 that is the closest to the electronic control unit 20. FIG. 9 is an enlarged view of a relevant portion in FIG. 8. Referring to FIGS. 8 and 9, the base plate 22 is arranged at the boss 30 via a heat insulating sleeve 50, and the temperature sensor component 40 is arranged between the base plate 22 and a head 24H of the bolt 24.

In other words, the bolt 24 is fastened to the boss 30. Starting from the boss 30 side, the heat insulating sleeve 50, the base plate 22, and the washer 42 (the temperature sensor component 40) are arranged in this order between the boss 30 and the bolt head 24H. The heat insulating sleeve 50, the base plate 22, and the washer 42 (the temperature sensor component 40) are fixed by the common bolt 24. The bolt 24 is made of metal.

A lead wire 52 extended from the sensor body 46 of the temperature sensor component 40 is connected to a terminal 20a of the control unit 20. In a modified embodiment, the sensor body 46 and the control unit 20 may be connected together with a separate wire.

Reference numeral 60 shown in FIG. 8 denotes a recoil starter. As is well known, an operator pulls up with his/her hand a recoil grip or an operating member 62, associated with the recoil starter 60 for starting up the engine body 2.

FIG. 8 also shows that the cylinder block 64 is constituted by the cylinder portion 8 and an upper crankcase portion 66. A lower crankcase 68 is fixed to the upper crankcase portion 66. As is well known, the upper crankcase portion 66 and the lower crankcase 68 together form a crankcase (not shown). A piston (not shown) is arranged in the cylinder portion 8 such that the piston is reciprocable, and the piston forms a combustion chamber.

According to the embodiment, the temperature sensor component 40 is fastened together with the base plate 22 of the control unit 20 to the boss 30 by the metal bolt 24 fixing the base plate 22. This configuration achieves great ease of assembly and maintenance of the temperature sensor component 40. The maintenance includes replacement of the temperature sensor component 40.

The boss 30 is located at the cylinder portion 8 where the combustion chamber is formed. Accordingly, heat of the engine body 2 is transferred to the temperature sensor component 40 via the metal bolt 24. In other words, the heat of the engine body 2 is transferred to the temperature sensor component 40 directly and in real time, although via the bolt 24. In addition, the temperature sensor component 40 is arranged adjacent to the cylinder portion 8 of the cylinder block 64 made of an aluminum alloy. Thus, the temperature sensor component 40 is located in an atmosphere containing heat emitted by the air-cooling fin 6. As a result, the sensor body 46, which is arranged in order to detect the temperature of the engine body 2, has excellent responsivity.

Because the sensor body 46 is located adjacent to the electronic control unit 20, the wire, the lead wire 52, that connects the sensor body 46 and the electronic control unit 20 may be short. In addition, because the lead wire 52 can be routed without crossing other members (e.g., a casing) by locating the sensor body 46 adjacent to the control unit 20, there is no need to mind an interference problem between the lead wire 52 and any component that could cause accidental disconnection of the lead wire 52.

In the embodiment described with reference to FIGS. 1 to 9, the boss 30 to which the temperature sensor component 40 is mounted is originally intended to fix the control unit 20 to the engine body 2. Like this, the use of a mounting part having a threaded hole that is originally intended for another purpose, that is, a boss or a mounting seat formed at the cylinder block 64 (including the upper crankcase portion 66) eliminates the need to recreate a molding die for the cylinder block 64.

More specifically, the cylinder block 64 may have a mounting part, such as a boss or a mounting seat, for fixing a component associated with the engine body 2 using a threaded component like a bolt. When the mounting part having a threaded hole is formed integrally with the cylinder block 64 for this purpose, the mounting part having a threaded hole may be used to fix the temperature sensor component 40 (the heat transfer washer 42). In this way, the temperature sensor component 40 can be fixed to the cylinder block 64 while using the molding die for the cylinder block 64 as it is.

The mounting part having a threaded hole formed on the cylinder block 64 may be a seat for mounting the spark plug 10, for example. The temperature sensor component 40 can be installed on top of the cylinder portion 8 as the spark plug 10 is fixed to the cylinder block 64 with the heat transfer washer 42 inserted in between the spark plug 10 and the cylinder block 64.

Figure 10:
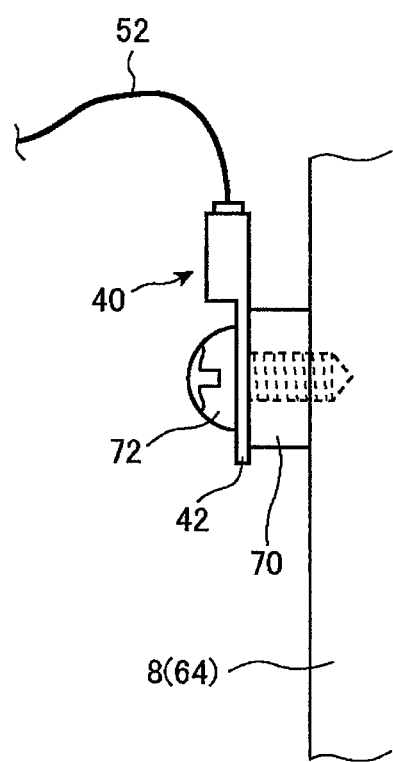
FIG. 10 is an illustration for describing a case of bolting the temperature sensor component to a dedicated mounting part having a threaded hole.

It may be configured such that a dedicated mounting part 70 is prepared at any point of the cylinder block 64 as shown in FIG. 10 for a primary purpose of installing the temperature sensor component 40 and the temperature sensor component 40 is fixed to the dedicated mounting part 70 using the bolt 72. In a modified embodiment, the dedicated mounting part 70 may be a screw member, although not shown in the figure. The screw member may be arranged at the cylinder block 64 such that the screw member is fixed to a threaded hole of the cylinder block 64. Alternatively, the cylinder block 64 may be cast with an end of the screw member embedded therein. The temperature sensor component 40 may be fixed to the cylinder block 64 by using a nut to be screwed onto the screw member.

The dedicated mounting part 70 may be arranged on the cylinder block 64 preferably in an area corresponding to the combustion chamber. To be specific, the dedicated mounting part 70 may be arranged in a range from the spark plug 10 to a scavenge port or from the spark plug 10 to an exhaust port, relative to a height level along the axis of the cylinder block 64. This allows the sensor body 46 to detect the temperature of the combustion chamber responsively.

The temperature sensor component 40 may be positioned such that the sensor body 46 and the lead wire 52 are exposed entirely only by removing the engine cover. The arrangement position of the temperature sensor component 40 is preferably determined so that the temperature sensor component 40 is located as close to the control unit 20 as possible. That is, the dedicated mounting part 70 may be arranged adjacent to the terminal 20a of the control unit 20. Most preferably, the dedicated mounting part 70 may be arranged in an area where there is no member interfering with the lead wire 52.

The drive portion 100 of the portable working machine shown in FIG. 1 includes an engine cover, although not shown in the figure. The engine cover covers the engine body 2. The removal of the engine cover allows the sensor body 46 of the temperature sensor component 40 and the lead wire 52 to be exposed entirely. Accordingly, a failed temperature sensor component 40 can be replaced easily.

REFERENCE SIGNS LIST

100 Drive portion of portable working machine
2 Engine body
4 Carburetor
6 Air-cooling fin
8 Cylinder portion of cylinder block
10 Spark plug 18 Fan rotor
20 Electronic control unit
20a Terminal of control unit
24 Bolt for fixing control unit
26 Magnet
28 Iron core
30 Boss for fixing control unit
40 Temperature sensor component
42 Heat transfer washer (terminal)
46 Sensor body
52 Lead wire extended from sensor body
70 Dedicated mounting part
72 Bolt of dedicated mounting part

What is claimed is:

1. A portable working machine including a control unit controlling the portable working machine using an engine temperature as a parameter, the portable working machine comprising:
    an air-cooled engine body;
    a mounting part formed at a cylinder block of the engine body;
    a temperature sensor component including a heat transfer terminal, the temperature sensor component detecting the engine temperature and supplying the detected engine temperature to the control unit; and
    a fixing member for fixing the heat transfer terminal of the temperature sensor component to the mounting part,
    wherein the air-cooled engine body is formed by a single cylinder 2-stroke internal combustion engine,
    the mounting part is formed at a cylinder portion of the cylinder block, and
    the mounting part is a boss having a threaded hole for fixing the control unit to the cylinder portion, and
    the fixing member is a bolt.

2. The portable working machine of claim 1, wherein the mounting part is arranged in a range from a spark plug mounting part at which a spark plug is mounted to a scavenging port, relative to a height level along an axis of the cylinder block.

3. The portable working machine of claim 2, wherein
    the portable working machine includes a removable engine cover covering a part of the engine body, and
    the temperature sensor component and the control unit are arranged in an area covered by the engine cover.

4. The portable working machine of claim 3, wherein the mounting part is arranged in an area where a wire between the temperature sensor component and the control unit does not interfere with another member.

5. The portable working machine of claim 1, wherein
    the engine body has a fan rotor fixed to a crankshaft and a magnet arranged on an outer circumferential surface of the fan rotor,
    the control unit has an iron core extended from the control unit toward the fan rotor, and
    the magnet and the iron core partially form a power generating mechanism.

* * * * *